US009515539B2

(12) United States Patent
Prudham et al.

(10) Patent No.: US 9,515,539 B2
(45) Date of Patent: Dec. 6, 2016

(54) THREE-PHASE ELECTRIC MOTOR WITH A LOW DETENT TORQUE

(75) Inventors: Daniel Prudham, Thise (FR);
Pierre-Daniel Pfister, Sonceboz (CH);
Thibaut Richard, Navenne (FR)

(73) Assignee: MMT SA, Zug (CH)

( * ) Notice: Subject to any disclaimer, the term of this patent is extended or adjusted under 35 U.S.C. 154(b) by 0 days.

(21) Appl. No.: 13/319,424

(22) PCT Filed: May 11, 2010

(86) PCT No.: PCT/FR2010/000363
§ 371 (c)(1),
(2), (4) Date: Jan. 5, 2012

(87) PCT Pub. No.: WO2010/130894
PCT Pub. Date: Nov. 18, 2010

(65) Prior Publication Data
US 2012/0104905 A1   May 3, 2012

(30) Foreign Application Priority Data
May 11, 2009   (FR) ..................... 09 02256

(51) Int. Cl.
| H02K 29/08 | (2006.01) |
| H02K 1/14 | (2006.01) |
| H02K 1/27 | (2006.01) |
| H02K 29/03 | (2006.01) |

(52) U.S. Cl.
CPC .............. *H02K 29/03* (2013.01); *H02K 1/146* (2013.01); *H02K 1/278* (2013.01)

(58) Field of Classification Search
CPC ......... H02K 29/08; H02K 1/146; H02K 1/278
USPC ........... 310/216.057, 269, 216.074, 216.091,
310/216.093, 216.097, 154.38, 49.37,
310/186,310/49.44, 156.46
See application file for complete search history.

(56) References Cited

U.S. PATENT DOCUMENTS

| 4,417,167 A | * | 11/1983 | Ishii et al. ................... 310/67 R |
| 5,095,238 A | * | 3/1992 | Suzuki et al. ........... 310/156.46 |
| 5,642,013 A | | 6/1997 | Wavre |
| 6,104,117 A | | 8/2000 | Nakamura et al. |
| 6,320,286 B1 | * | 11/2001 | Ramarathnam ................. 310/50 |

(Continued)

FOREIGN PATENT DOCUMENTS

| DE | 103 14 763 A1 | 10/2004 |
| EP | 1598920 A2 | 11/2005 |

(Continued)

OTHER PUBLICATIONS http://last.hit.bme.hu/download/fulop/Publikaciok/PerPoly_Motor.pdf.*

(Continued)

*Primary Examiner* — Terrance Kenerly
(74) *Attorney, Agent, or Firm* — Harness, Dickey & Pierce, P.L.C.

(57) ABSTRACT

The disclosure relates to a three-phase electric motor that uses high magnetic energy permanent magnets and that has a low detent torque. The motor consists of a rotor with N pairs of poles and of a stator portion with teeth extending radially from an annular gear. The teeth have windings and the ends thereof comprise an arc of circle, the middle of which is located on a radius R1 and two sides defining an alpha angle, the vertex of which is located on a radius R2. The ratio R2/R1 is substantially equal to (1+/−0.26/N), and the alpha angle is between 110 and 135°.

20 Claims, 10 Drawing Sheets

(56) References Cited

U.S. PATENT DOCUMENTS

| | | | |
|---|---|---|---|
| 6,847,149 B2 | 1/2005 | De Filippis | |
| 6,946,760 B2 | 9/2005 | Crapo et al. | |
| 7,038,345 B2* | 5/2006 | Fratta | 310/156.53 |
| 7,183,684 B2 | 2/2007 | Miyashita et al. | |
| 7,304,450 B2 | 12/2007 | Prudham | |
| 7,589,445 B2 | 9/2009 | Gandel et al. | |
| 2003/0107290 A1 | 6/2003 | De Filippis | |
| 2003/0160674 A1 | 8/2003 | Komuro et al. | |
| 2005/0001509 A1 | 1/2005 | Gandel et al. | |
| 2005/0088047 A1 | 4/2005 | Crapo et al. | |
| 2005/0093390 A1* | 5/2005 | Komuro | H02K 15/03 310/156.43 |
| 2005/0258706 A1* | 11/2005 | Horst et al. | 310/218 |
| 2007/0126308 A1* | 6/2007 | Abou-Akar et al. | 310/216 |
| 2008/0124235 A1* | 5/2008 | Honkura et al. | 417/423.14 |
| 2009/0085416 A1* | 4/2009 | Masuzawa et al. | 310/44 |
| 2009/0174280 A1 | 7/2009 | Prudham | |
| 2010/0133940 A1* | 6/2010 | Grossmann et al. | 310/156.46 |
| 2011/0031824 A1 | 2/2011 | Prudham | |

FOREIGN PATENT DOCUMENTS

| | | |
|---|---|---|
| FR | 2 890 498 A1 | 3/2007 |
| JP | 2002-136001 A | 5/2002 |

OTHER PUBLICATIONS http://www.haydonkerk.com/Resources/SummaryGlossary/tabid/225/Default.aspx.*

Bar-Cohen, "Yoseph. High-Temperature Materials and Mechanisms." High-Temperature Motors. Chapter 9. pp. 289. (Mar. 5, 2014).

Hanselman, Duane. Excerpts from "Brushless Permanent Magnet Motor Design" 2nd Edition. 6 Pages. (2006).

NIDEC Corporation "1-2-3 Brushless DC Motor" [online] <URL: http://www.nidec.com/en-NA/technology/motor/basic/00005/>, believed to have been publicly available prior to May 11, 2009.

ResMed Motor Technologies Inc. [online] <URL: http://educypedia.karadimov.info/library/4-pole_bldc_motor.swf>, believed to have been publicly available prior to May 11, 2009.

Zhu, Z. Q. "Reduction of Cogging Torque in Interior-Magnet Brushless Machines." IEEE Transactions on Magnetics. v. 39. No. 5. pp. 3238-3240. Sep. 2003.

Photos of various electric motors that, based upon information and belief, were in use or offered for sale in the U.S prior to May 11, 2009.

* cited by examiner

THREE-PHASE ELECTRIC MOTOR WITH A LOW DETENT TORQUE

CROSS-REFERENCE TO RELATED APPLICATIONS

This application is a National Phase Entry of International Application No. PCT/FR2010/000363, filed on May 11, 2010, which claims priority to French Patent Application Serial No. 09/02256, filed on May 11, 2009, both of which are incorporated by reference herein.

BACKGROUND AND SUMMARY

The present invention relates to a three-phase electric motor using high-efficiency permanent magnets having a low detent torque, in particular for high-speed drive applications in the industrial or automotive field.

The requirements in terms of bulk and efficiency of electric motors are leading to the use of high-energy magnets for the production of the rotors and the more the energy of the materials employed is increased, the more difficult it becomes to control the residual torques of the these motors. The cost of these motors depends not only on the costs of the materials employed but also on the costs of the methods used to produce the various elements. It is therefore important to implement simple solutions for the production of the spare parts and for the assembly of the various components of these motors. In particular, the control of the residual torques may lead to forms of stators that are incompatible with the more economical winding methods. Furthermore, the use of these motors at high speeds requires the use of a small number of pairs of poles for the rotor so as to reduce the losses in the motor and in the electronics.

FIGS. 5 and 6 describe motors of the prior art that make it possible to obtain low residual torques with rotors having a small number of pairs of poles. The motor of FIG. 5 uses a rotor with two pairs of poles and a stator with 6 teeth (91). The stator poles occupy 90% of the available surface area and thus make it possible to obtain a low residual torque. The small notch width results in a long and difficult winding, which is therefore costly and also has a poor bulk factor.

The motor of FIG. 6 also uses a rotor with two pairs of poles and, compared to the motor of FIG. 5, each stator pole is divided into three teeth. A stator winding then surrounds three teeth of the stator to form a single pole. The 18 stator teeth occupy 70% of the available surface area and thus make it possible to obtain a low residual torque, but require an interleaved winding of the three phases, which is therefore long and costly, and ill-suited to very large mass production.

Also known from the state of the art is the use of rotors that exhibit a sinusoidal induction and that, as a result, make it possible to reduce the residual torques. However, to obtain residual torque values such as those demanded by most industrial or automotive applications, the induction of these rotors must exhibit a very low distortion. The harmonic breakdown of the induction of these rotors must show very low percentages for harmonic 3, harmonic 5 and harmonic 7, in particular for the last two. In particular, by using high-energy magnets, the percentages of harmonic 5 and of harmonic 7 must be less than 0.5%. If the percentages of harmonics 5 and 7 are of the order of, or greater than, 0.5%, it is necessary to combine these rotor solutions with a stator solution that is appropriate in terms of the reduction of the residual torques. The motors of FIGS. 5 and 6 sometimes use rotors that exhibit a sinusoidal induction.

The present invention aims to remedy the drawbacks of the state of the art by proposing a motor structure which is particularly appropriate for very large volume manufacture, and suited to magnets with very high energy, using a small number of pairs of poles, typically 2, a reduced number of windings, typically 3, and exhibiting a very low residual torque as well as high performance levels at high speed. The present invention proposes a robust motor, exhibiting a low detent torque, excellent dynamic performance levels, and that is particularly economical by virtue of a simple structure for the stator and for the rotor. The motor of the invention is more specifically defined by claim 1. Other features, optional but advantageous, are defined in the claims that are directly or indirectly dependent on claim 1.

To this end, the invention relates to a three-phase motor formed by a stator part excited by electric windings and by a rotor with N pairs of poles, the stator part having teeth extending radially from an annular gear. The width of the stator poles is determined on the one hand to avoid any saturation in the tooth, and on the other hand to cancel the effect of the main magnetization harmonics and also so as to allow for an economical winding by allowing for the placement of windings produced outside the stator.

The stator poles are straight teeth which comprise an arc of circle (17) at their end defining an airgap at the center of the tooth and an airgap which can be enlarged or reduced on each of the sides (18 and 19). This means that the end of the tooth can be of convex or concave shape. The width of the stator pole, which is defined as being the angle at the center which encompasses the whole tooth, and the radius of the arc of circle (17) which forms the end of the tooth, are determined in such a way as to obtain, for each tooth, a residual torque that is as low as possible. The width of the tooth forming the core of the winding is defined according to the maximum energy of the magnets used. This energy can range from 6 to 40 MGOe, but the stator poles represent, in all cases, less than 60% of the available surface area. Thus, ease of winding is guaranteed.

As FIG. 12 shows, if the geometry of the end of the tooth is adapted according to the energy of the magnets and according to the magnetization harmonics, it still always observes one and the same rule which makes it possible to define an angle alpha (24) which is tangential to the sides (18 and 19) of the stator pole. Since the cancellation of the residual torque is obtained for each of the teeth individually, there is no need to seek a torque compensation between two teeth or a group of teeth as in certain motors of the prior art. New combinations between the number of teeth of the stator and number of pairs of poles of the rotor become useable while retaining all the advantages in terms of residual torque, motor torque constant and ease of industrialization and therefore represent a better trade-off in terms of cost and performance, in particular for high-speed drive applications.

BRIEF DESCRIPTION OF THE FIGURES

The invention will be better understood from reading the following description of known or invention-specific embodiments given as non-limiting examples, this description making reference to the appended drawings in which.

(21) is approximately 30% of the stator pole pitch (22) and the end of the tooth is of concave shape.

Figure 3:
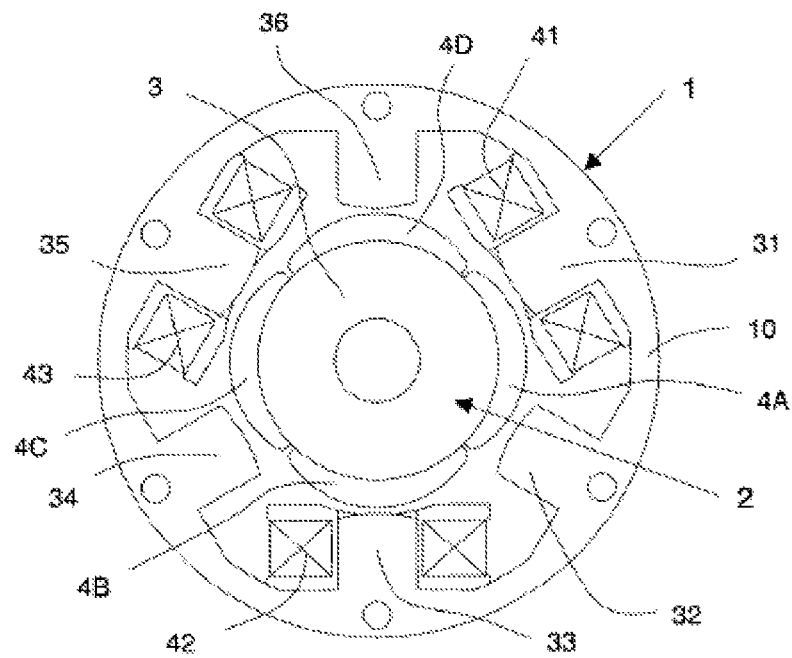

FIG. 3 represents a transversal cross-sectional view of a motor according to the invention. The motor comprises a stator (1) having 6 teeth (31 to 36) and a rotor (2) consisting of four shaped tiles (4A, 4B, 4C and 4D) assembled on a ferromagnetic yoke (3).

Figure 4:
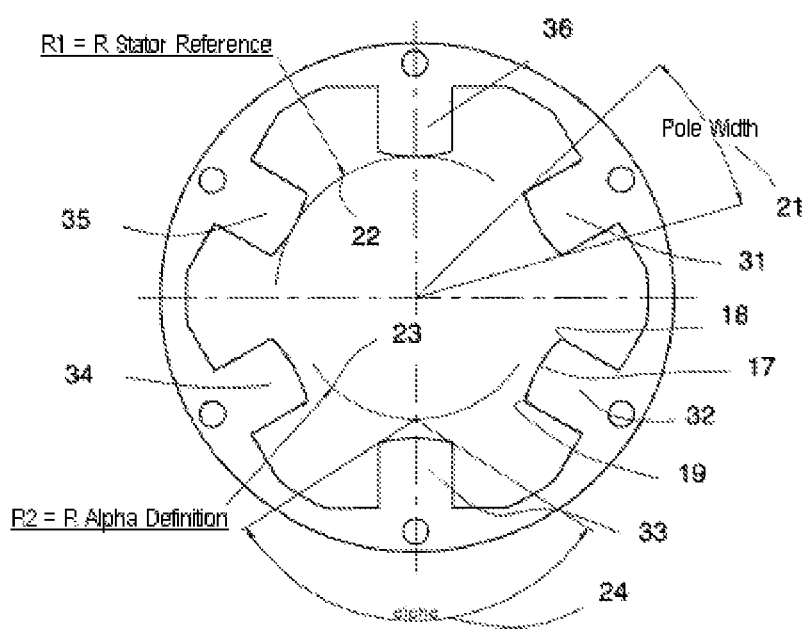

FIG. 4 represents a transversal cross-sectional view of the stator of the motor represented in FIG. 3. The pole width (21) is approximately 50% of the stator pole pitch (22) and the end of the tooth (25) is of convex shape.

Figure 5:
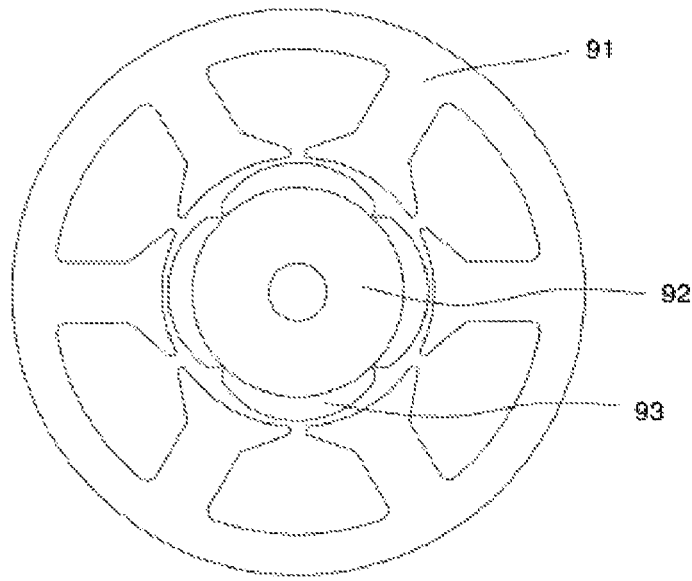

FIG. 5 represents a transversal cross-sectional view of a motor of the prior art. The motor comprises a stator (91) having 6 teeth and a rotor consisting of four shaped tiles (93) assembled on a ferromagnetic yoke (92). The stator poles occupy approximately 90% of the available surface area.

Figure 6:
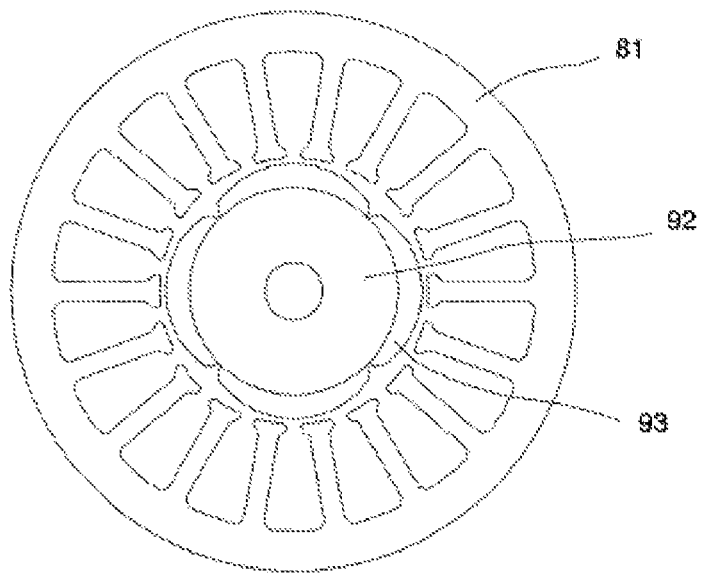

FIG. 6 represents a transversal cross-sectional view of another motor of the prior art. The stator (81) comprises 18 teeth which occupy approximately 70% of the available surface area.

Figure 7:
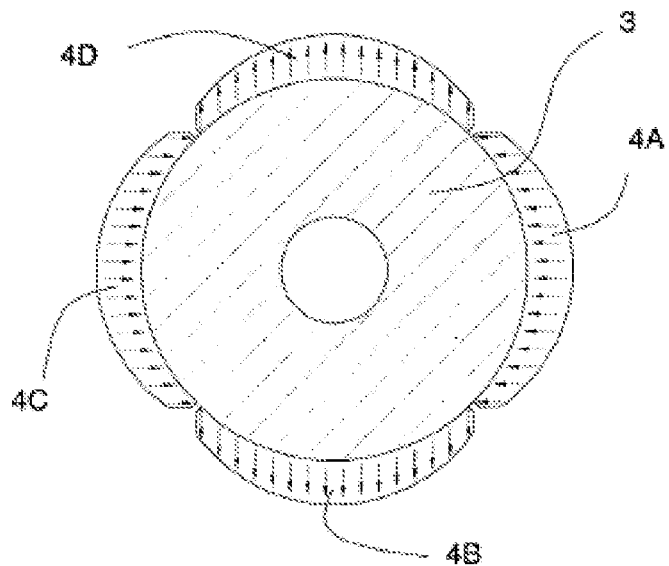

FIG. 7 represents a transversal cross-sectional view of a rotor with two pairs of poles consisting of four tiles (4A, 4B, 4C and 4D) made of an anisotropic magnetic material and glued onto a ferromagnetic yoke (3).

Figure 8:
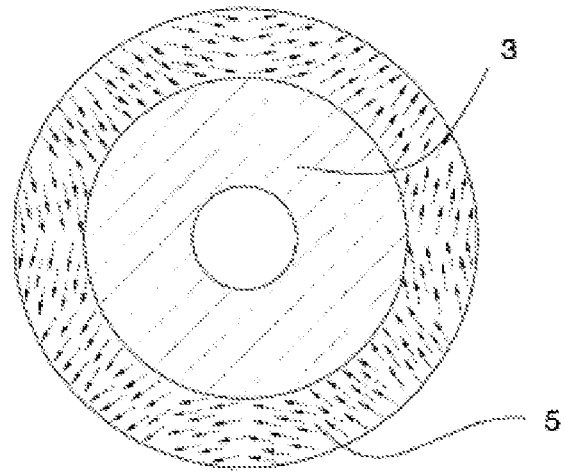

FIG. 8 represents a transversal cross-sectional view of a rotor with two pairs of poles consisting of a ring (5) made of an isotropic magnetic material, sinusoidally magnetized, and glued onto a yoke (3).

Figure 9:
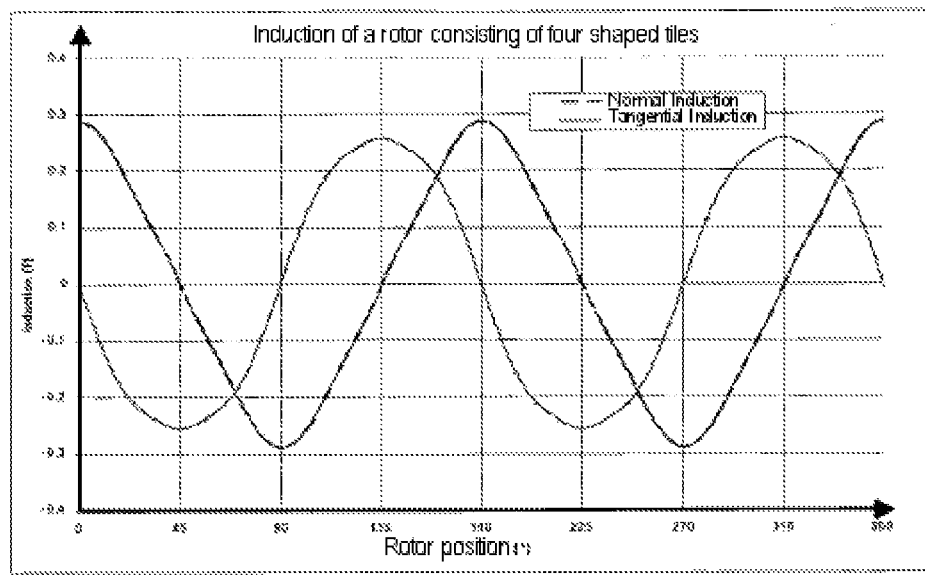

FIG. 9 represents a graph showing the amplitude of the normal induction and of the tangential induction as a function of the position of a rotor as described in FIG. 7.

Figure 10:
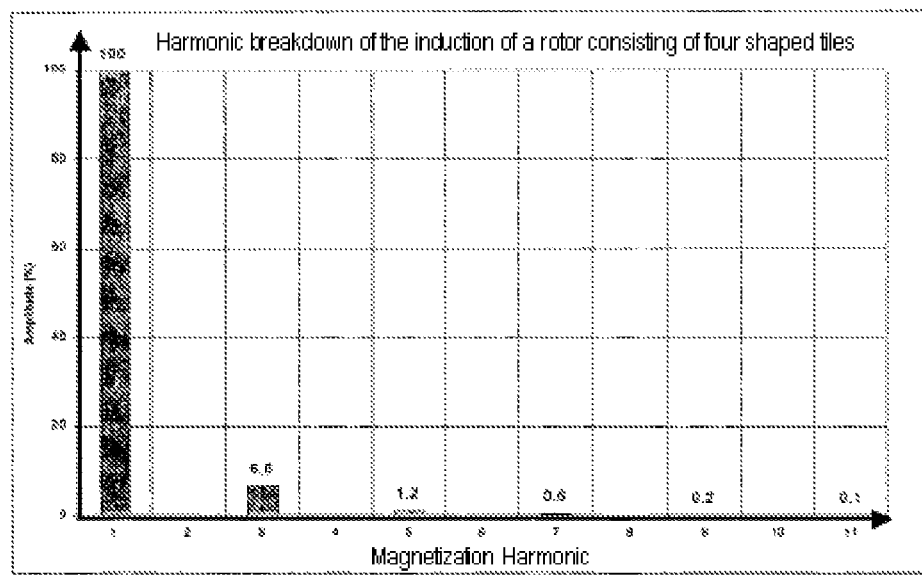

FIG. 10 shows the harmonic breakdown of the normal or tangential induction of a rotor as described in FIG. 7.

Figure 11:
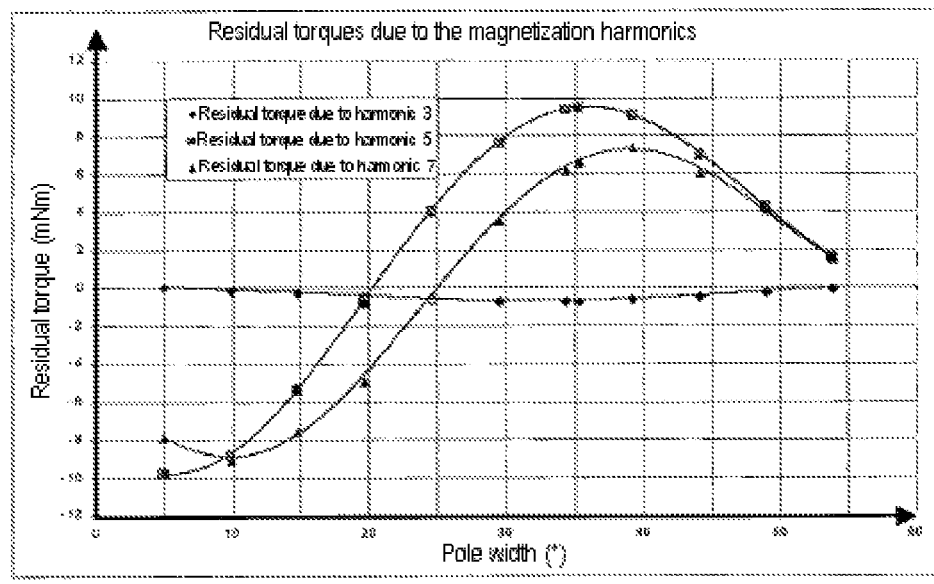

FIG. 11 represents the trend of the residual torques due to the different magnetization harmonics, in the case of a stator with six teeth (11 to 16) and a rotor with two pairs of poles, as a function of the stator pole width (21).

Figure 12:
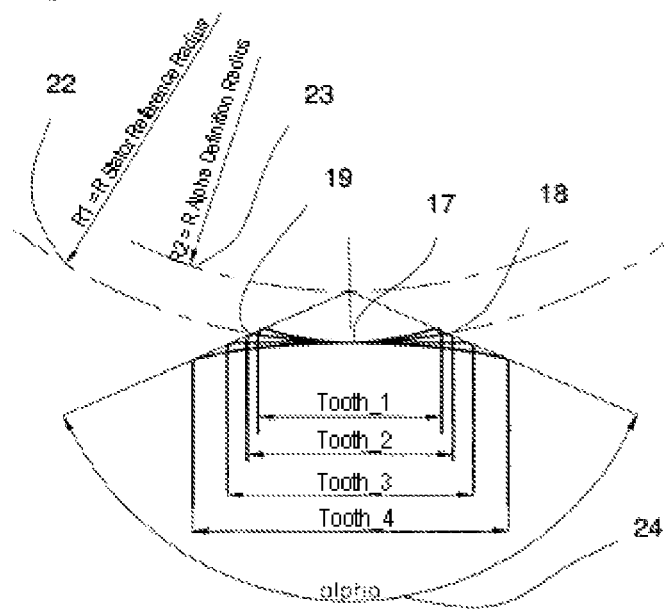

FIG. 12 represents different tooth geometries and shows that the middle of the arc (17) forming the tooth end is always placed on one and the same radius R1 (22) and that one and the same angle alpha (24), the vertex of which is situated on a radius R2 (23), is tangential to the sides (18 and 19) of the teeth (tooth_1 to tooth_4).

Figure 13:
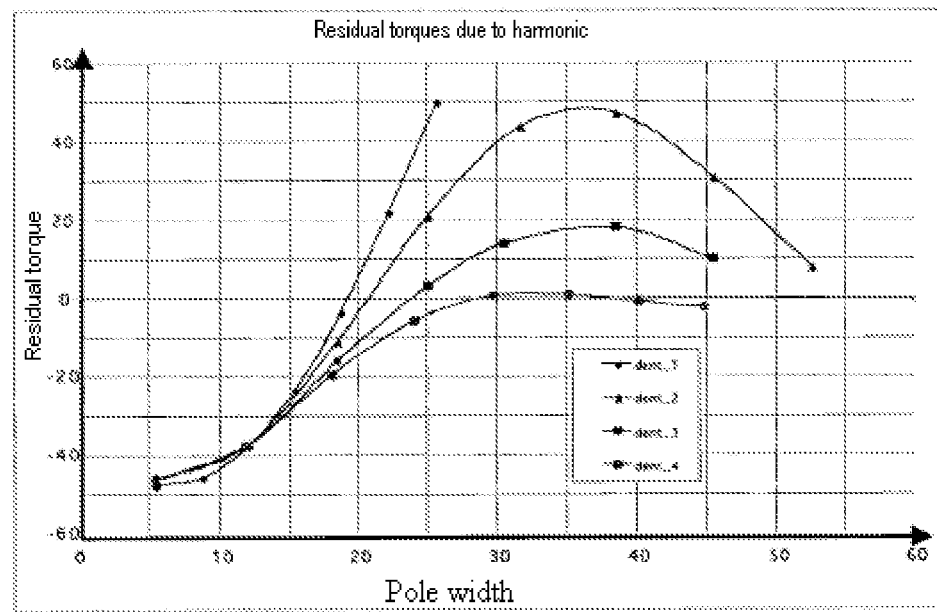

FIG. 13 represents a graph showing the trend of the residual torque due to magnetization harmonic 5, in the case of the stator with 6 teeth and a rotor with 2 pairs of poles, as a function of the stator pole width (21) and for different stator tooth geometries.

Figure 14:
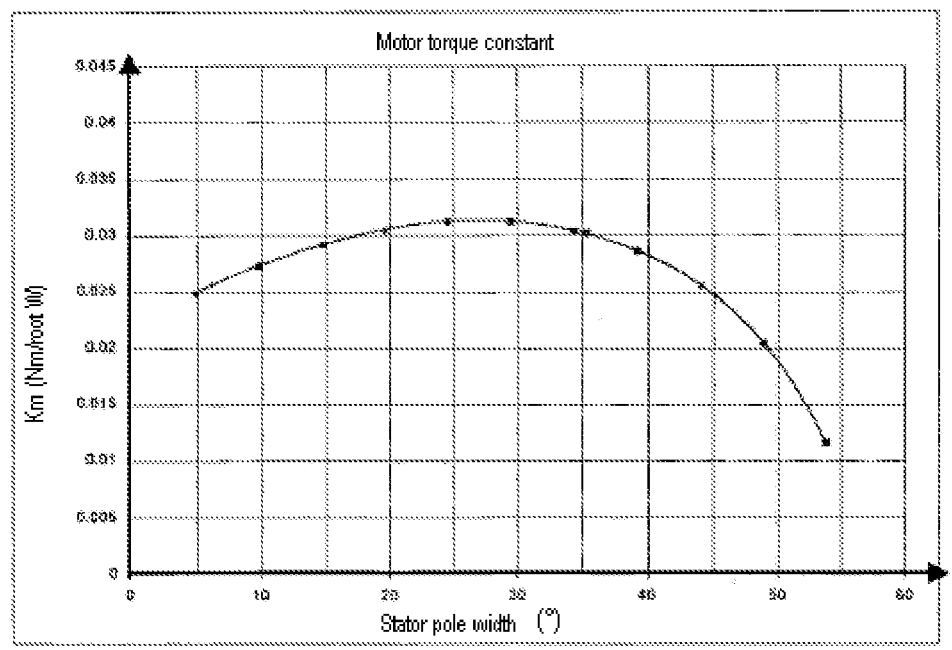

FIG. 14 represents a graph showing the trend of the motor constant Km, which is the torque per root watt that the motor can provide, as a function of the stator pole width (21).

Figure 15:
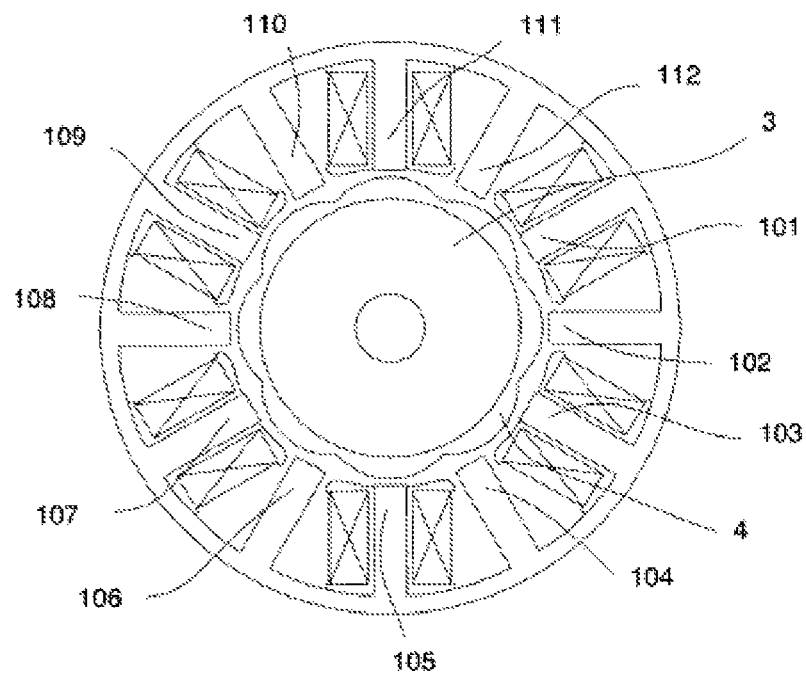

FIG. 15 represents a transversal cross-sectional view of a motor according to the invention and comprising a rotor with 4 pairs of poles. The motor comprises a stator having 12 teeth (101 to 112) and a rotor consisting of a shaped magnet (4) injected onto a ferromagnetic yoke (3).

Figure 16:
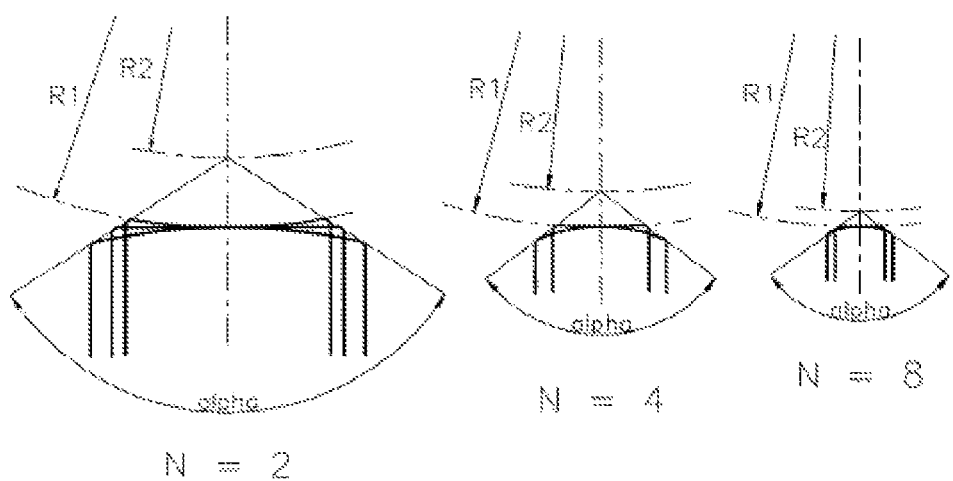

FIG. 16 represents different stator teeth shapes for motors respectively comprising rotors with 2, 4 or 8 pairs of poles.

Figure 17:
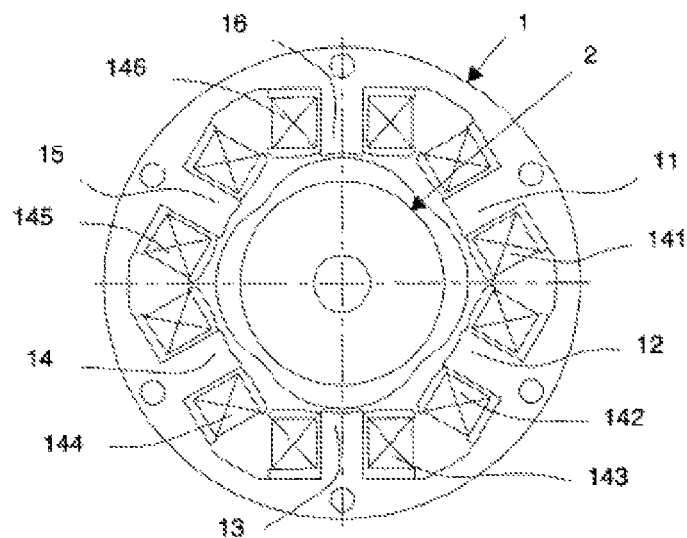

FIG. 17 represents a transversal cross-sectional view of a motor according to the invention. The motor comprises a stator (1) having 6 teeth (11 to 16) and a rotor (2) with two pairs of poles; each of the teeth bears a winding (141 to 146).

Figure 18:
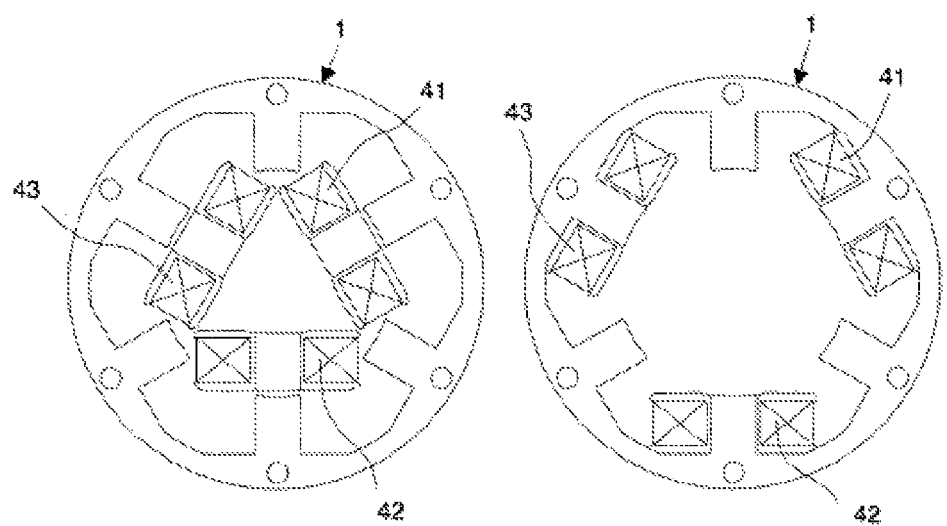

FIG. 18 represents a transversal cross-sectional view of a stator (1) of a motor according to the invention, before and after the insertion of the windings. The stator has 6 teeth and one tooth in every two bears a winding. The three windings (41 to 43) can be wound separately, then presented simultaneously inside the stator and inserted onto their respective teeth.

Figure 19:
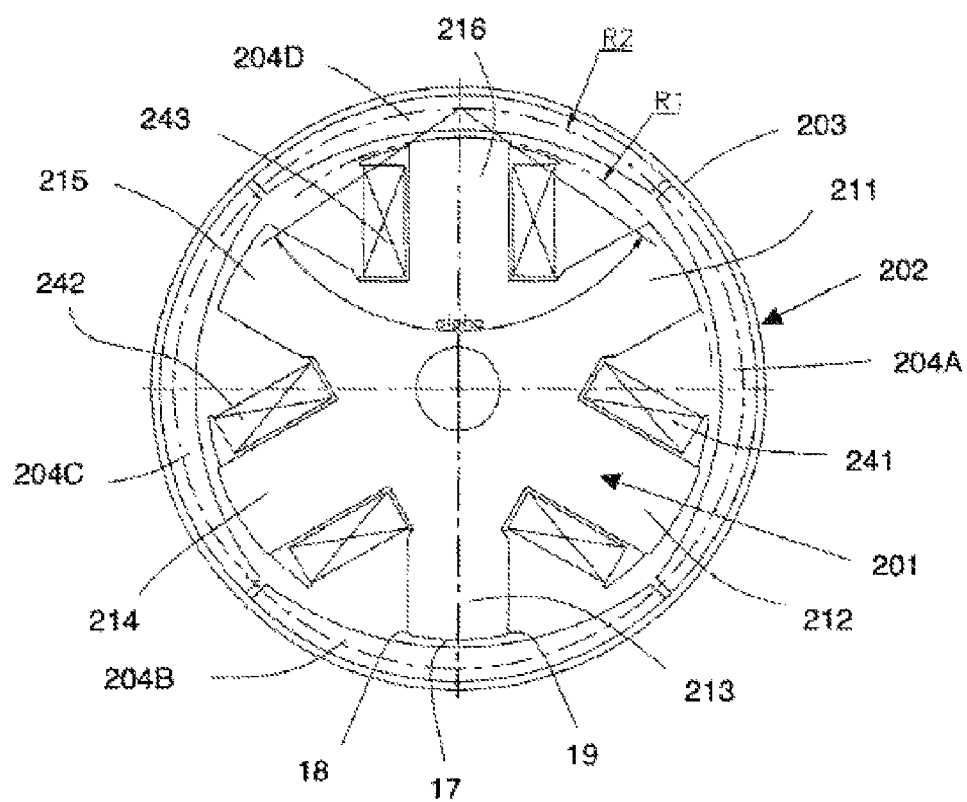

FIG. 19 represents a transversal cross-sectional view of a motor with external rotor according to the invention. The stator (201), comprising 6 teeth (211 to 216) and three windings (241 to 243), is located inside a rotor (202) consisting of 4 magnet tiles (204A to 204B) mounted in a ferromagnetic yoke (203).

DETAILED DESCRIPTION

One of the solutions used to produce a rotor is represented in FIG. 7, this rotor then exhibiting a sinusoidal induction. Four magnet tiles (4A, 4B, 4C and 4D) are glued onto an iron yoke (3). The external shape of these tiles makes it possible to approximate a sinusoidal induction, even if the magnetization of each of the tiles is produced in a single direction. For cost reasons, the geometry of these tiles must, however, remain simple and the manufacturing tolerances cause differences between each of the poles of the rotor. In practice, an induction such as that represented in FIG. 9 is therefore obtained. The harmonic breakdown, shown in FIG. 10, then reveals percentages which are 6.6% for the harmonic 3, 1.2% for the harmonic 5 and 0.6% for the harmonic 7. The aim of the present invention is to propose a simple and economical motor that will make it possible to use rotors with magnetization harmonic percentages of this order of magnitude, while obtaining very low residual torques and without the winding-related drawbacks imposed by the solutions of the prior art.

FIG. 11 shows, for a motor that has 6 teeth on the stator and 2 pairs of poles on the rotor, the trend of the residual torques due to each of the magnetization harmonics according to the stator pole width, in the case of a shaped stator pole (tooth_2) as described in FIG. 12. For this shape (tooth_2), the radius of the arc of circle (17) forming the end of the tooth is equal to the stator reference radius R1 (22). If harmonics of the same amplitude are considered, it can be seen that the residual torque due to the harmonic 3 is much lower than that due to the harmonic 5 and similarly to that due to the harmonic 7.

The residual torque due to the harmonic 3 is maximum for stator pole widths of between 30 and 35°. It decreases progressively if the pole width is widened or narrowed. The residual torque due to the harmonic 5 is maximum for a pole width of 35° or for a very narrow pole of 5°. By contrast, this residual torque is 0 for a tooth width of 20°. The residual torque due to the harmonic 7 is maximum for a pole width of 38° or for a narrow pole of 10°. This residual torque is 0 for a pole width of 26°.

A motor according to one possible embodiment of the invention and having shaped teeth (tooth_2) will include a stator (1) having 6 teeth (11 to 16) having a pole width (21) of between 20 and 26°. Between 20 and 26°, the residual torques due to the harmonic 5 and to the harmonic 7, as shown in FIG. 11, are of opposite signs and are mutually compensated. For the rotor to give more harmonic 5 than harmonic 7, a tooth width closer to 20° will be chosen. However, if the harmonic 7 is to be greater than the harmonic 5, a tooth width closer to 26° will be chosen. If the percentages of harmonics 5 and 7 are of the same order of magnitude, a pole width of 23° will be chosen.

FIG. 14 shows the trend of the motor constant Km according to the stator pole width. When the tooth is narrower, the torque per ampere-turn constant decreases, but with the volume available for the copper increasing, the motor constant Km, which is expressed in Nm per root of watts, increases. It is maximum between 20 and 35°. There is therefore an advantage in using pole widths of between 20 and 35°.

Figure 1:
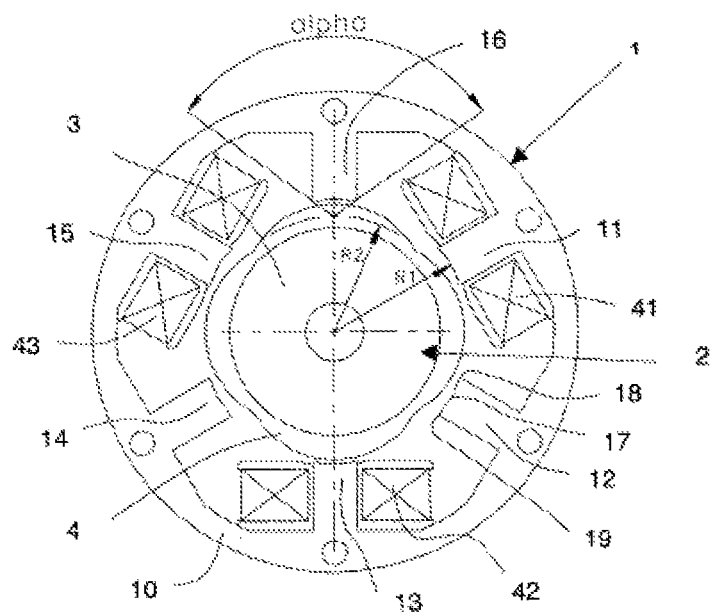
FIG. 1 represents a transversal cross-sectional view of a motor according to the invention. The motor comprises a stator (1) having 6 teeth (11 to 16) and a rotor (2) consisting of a shaped magnet (45) injected onto a ferromagnetic yoke (3).
Figure 2:
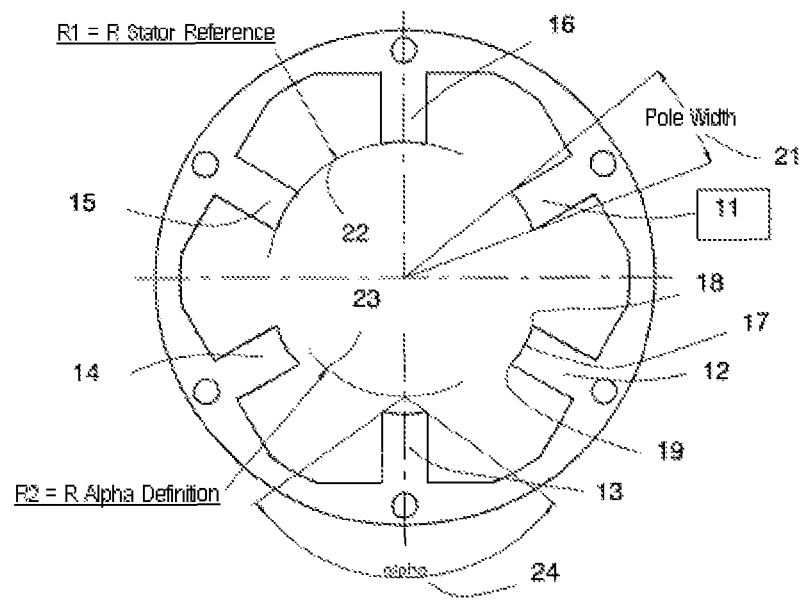
FIG. 2 represents a transversal cross-sectional view of the stator of the motor represented in FIG. 1. The pole width

FIG. 1 represents a preferred embodiment of the invention. The stator (1) is produced by a stack of thin magnetic plates. It comprises 6 teeth (11 to 16) of identical width of between 20 and 26°. One tooth in every two bears a winding (41 to 43). The rotor (2) with two pairs of poles uses a magnetic material that has a maximum magnetic energy less than 25 MGOe. It can be obtained by overmoulding a magnet with plastic binder on an iron yoke. This production method makes it possible to obtain an external shape of the magnet which will result, after magnetization, in an induction that is substantially sinusoidal according to the position being obtained. FIG. 8 represents another embodiment of the rotor which consists of a ring (5) made of an isotropic material. This ring (5) is first magnetized sinusoidally using a specific device, then glued onto a yoke (3) which may or may not be ferromagnetic.

The only drawback in using narrow teeth occurs with magnets that have a maximum magnetic energy greater than 25 MGOe because a saturation in the tooth then appears. Also, in another embodiment according to the invention (FIG. 3), the stator pole width will be between 28 and 36° so as to avoid the saturation by using magnets that have maximum energies of between 25 and more than 40 MGOe. So as to obtain the cancellation of the residual torques due to the harmonics 5 and 7, the end of the tooth is convex and takes the shape (tooth_4) as described in FIG. 12.

In fact, the graph presented in FIG. 13 shows how the pole width must be adapted according to the shape of the tooth to always obtain the cancellation of the residual torque due to the harmonic 5. Compared to the shape (tooth_2), it can be seen that a tooth with a more pronounced concave shape, such as the shape (tooth_1), will have a pole width that is a little smaller to obtain the cancellation of the residual torque. By contrast, teeth with a convex shape such as (tooth_3) and (tooth_4) will necessitate greater pole widths to obtain the cancellation of the residual torque. By showing the different teeth obtained on one and the same drawing (FIG. 12), it can be seen that, regardless of the tooth, the middle of the arc of circle (17) forming the end of the tooth is always situated on R1 (22), the stator reference radius, and that one and the same angle alpha (24) whose vertex is situated on a radius R2 (23) is tangential to both sides (18 and 19) of the tooth. When N, which is the number of pairs of poles of the rotor, is varied, it becomes evident, as FIG. 16 shows, that the pole width is inversely proportional to N but the angle alpha remains the same if the ratio R2/R1 is varied according to the relationship R2/R1=1−0.26/N.

To obtain the cancellation of the residual torque due to the harmonic 5, the angle alpha (24) must be substantially equal to 110°. For the harmonic 7, the same approach can be applied, and to obtain the cancellation of the residual torque due to the harmonic 7, the angle alpha (24) must be substantially equal to 135°.

Therefore, according to the invention, if a rotor exhibits much more of harmonic 5 than of harmonic 7, the angle alpha will be close to 110°, and if the harmonic 7 is very much greater than the harmonic 5, the angle alpha will be close to 135°. If the harmonics 5 and 7 have similar amplitudes, the angle alpha will be close to 122°.

FIG. 19 shows a preferred embodiment according to the invention. The construction produced relates to a motor with external rotor (202), but the same rules regarding the cancellation of the residual torques can be applied. The shape of the teeth (211 to 216) is also defined by virtue of an arc of circle (17) whose middle is situated on a radius R1 and of the angle alpha whose vertex is situated on the radius R2 and which is tangential to the sides (18 and 19) of the tooth. Since the structure is reversed, the radius R2 is this time greater than the radius R1 and the relationship which links R1 and R2 becomes R2/R1=1+0.26/N. The stator can have 3 windings (241 to 243) or 6 windings depending on the performance requirement. The rotor consists of four magnet tiles (204A to 204D) having a shape that makes it possible to obtain a radial induction and a tangential induction that are substantially sinusoidal.

The invention claimed is:

1. A three-phase electric motor comprising a rotor that has N pairs of poles and a stator portion, having 3×N teeth extending radially from an annular gear, each tooth with a pole width between 20° and 26° and no pole shoe, the stator portion being excited by electrical windings, each tooth having at its end an arc of circle and two sides, a middle of the arc of circle being situated on a first radius (R1) and the two sides defining an angle alpha, the vertex of which is situated on a second radius (R2), the first radius (R1) and the second radius (R2) defining a ratio R2/R1 substantially equal to (1+/−0.26/N), and the angle alpha is between 110° and 135°, wherein N is equal to 2, and the pole width is an angle having a vertex at the center of the stator portion and rays that extend through the two sides of the corresponding tooth.

2. The three-phase electric motor as claimed in claim 1, wherein each end of the tooth has a convex shape.

3. The three-phase electric motor as claimed in claim 1, wherein each end of the tooth has a concave shape.

4. The three-phase electric motor as claimed in claim 1, wherein the stator includes the electrical windings on the sides of each of the teeth, each side is straight and intersects the arcuate end of the tooth.

5. The three-phase electric motor as claimed in claim 1, wherein the stator has a winding for one tooth in every two.

6. The three-phase electric motor as claimed in claim 1, wherein the windings are wound separately then inserted into the stator.

7. The three-phase electric motor as claimed in claim 1, wherein the rotor includes a magnet attached to a yoke made of a ferromagnetic material.

8. The three-phase electric motor as claimed in claim 1, wherein the rotor includes four tiles, made of an anisotropic material and assembled on a yoke made of a ferromagnetic material.

9. The three-phase electric motor as claimed in claim 1, wherein the rotor includes a ring magnet made of an isotropic material.

10. The three-phase electric motor as claimed in claim 1, wherein the rotor includes a ring magnet having a polar anisotropy.

11. The three-phase electric motor as claimed in claim 1, wherein the stator includes a stack of thin plates.

12. The three-phase electric motor as claimed in claim 1, further comprising position detection elements acting with the rotor.

13. The three-phase electric motor as claimed in claim 1, wherein the rotor exhibits a normal induction and a tangential induction each containing less than 20% of harmonic 3, less than 2% of harmonic 5, and less than 2% of harmonic 7.

14. The three-phase electric motor as claimed in claim 1, wherein each tooth has a base and a distal end opposite the base, the base having a first width, the distal end having a second width that is approximately equal to the first width.

15. A three-phase electric motor comprising:
a rotor including two pairs of magnetic poles with at least one peripheral surface;
a stator including six radially extending teeth wrapped by conductive windings, each tooth with a pole width between 20° and 26°, a distal end of each tooth being no larger than the section of each tooth wrapped by the windings, and the distal end of each tooth facing the rotor having a concave shape different and nonparallel to that of the at least one peripheral surface of the facing poles in all rotational positions, wherein the pole width is an angle having a vertex at the center of the stator and rays that extend through two sides of the corresponding tooth; and
energy used by the magnetic poles being from 6 to 40 MGOe, but the stator teeth defining less than 60% an available circular surface area.

16. The three-phase electric motor as claimed in claim 15, wherein each tooth has straight sides intersecting the concave distal end.

17. The three-phase electric motor as claimed in claim 15, wherein the concave shape of the distal end of each tooth defines a larger air gap between a center of the distal end relative to the rotor than at a point of the distal end outboard of the center, in a rotational position centered with a pole or tile of the rotor.

18. The three-phase electric motor as claimed in claim 15, wherein the rotor and stator are part of an automotive vehicle.

19. The three-phase electric motor as claimed in claim 14, wherein the rotor includes four tiles, made of an anisotropic material and assembled on a yoke made of a ferromagnetic material.

20. The three-phase electric motor as claimed in claim 15, wherein the rotor exhibits a normal induction and a tangential induction each containing less than 20% of harmonic 3, less than 2% of harmonic 5 and less than 2% of harmonic 7.

* * * * *